(12) United States Patent
Park et al.

(10) Patent No.: US 10,108,055 B2
(45) Date of Patent: *Oct. 23, 2018

(54) CURVED LIQUID CRYSTAL DISPLAY

(71) Applicant: SAMSUNG DISPLAY CO., LTD., Yongin-si, Gyeonggi-do (KR)

(72) Inventors: Min Wook Park, Yongin-si (KR); Joo Hwan Park, Yongin-si (KR); Jeong Man Son, Yongin-si (KR); Cheong Hun Lee, Yongin-si (KR)

(73) Assignee: SAMSUNG DISPLAY CO., LTD., Yongin, Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/434,297

(22) Filed: Feb. 16, 2017

(65) Prior Publication Data

US 2017/0160605 A1  Jun. 8, 2017

Related U.S. Application Data

(63) Continuation of application No. 14/498,430, filed on Sep. 26, 2014, now Pat. No. 9,575,377.

(30) Foreign Application Priority Data

Dec. 30, 2013 (KR) .................. 10-2013-0167557

(51) Int. Cl.
G02F 1/1343 (2006.01)
G02F 1/1368 (2006.01)
(Continued)

(52) U.S. Cl.
CPC ...... G02F 1/134363 (2013.01); G02F 1/1337 (2013.01); G02F 1/1368 (2013.01);
(Continued)

(58) Field of Classification Search
CPC ... G02F 1/134363; G02F 2001/133742; G02F 2001/136218; G02F 2001/136222
See application file for complete search history.

(56) References Cited

U.S. PATENT DOCUMENTS 6,177,973 B1  1/2001  Lee et al.
7,538,850 B2  5/2009  Kim et al.
(Continued)

FOREIGN PATENT DOCUMENTS

JP  2012-242804 A  12/2012
JP  2013-050535 A  3/2013
(Continued)

OTHER PUBLICATIONS

Extended European Search Report for EP 14200206.2 dated May 28, 2015; Park, et al.

*Primary Examiner* — Kendrick Hsu
(74) *Attorney, Agent, or Firm* — Lee & Morse, P.C.

(57) ABSTRACT

A curved liquid crystal display including a first substrate having a curved shape; a plurality of gate lines and data lines on the first substrate; a plurality of thin film transistors connected to the gate lines and data lines; a plurality of color filters on the thin film transistors; a plurality of pixel electrodes and common electrodes on the plurality of color filters, the plurality of pixel electrodes and common electrodes overlapping with each other with a first insulating layer therebetween; a second substrate having a curved shape, the second substrate facing the first substrate; vertical alignment layers on inner sides of the first substrate and the second substrate; and a liquid crystal layer between the vertical alignment layers, wherein liquid crystal molecules of the liquid crystal layer are aligned to be vertical to surfaces of the first substrate and the second substrate when an electric field is not formed.

13 Claims, 14 Drawing Sheets

(51) Int. Cl.
  *G02F 1/1335* (2006.01)
  *G02F 1/1339* (2006.01)
  *G02F 1/1337* (2006.01)
  *G02F 1/1333* (2006.01)
  G02F 1/1362 (2006.01)

(52) U.S. Cl.
  CPC .... *G02F 1/13394* (2013.01); *G02F 1/133345* (2013.01); *G02F 1/133512* (2013.01); *G02F 1/133514* (2013.01); *G02F 1/133753* (2013.01); *G02F 1/136286* (2013.01); *G02F 2001/133742* (2013.01); *G02F 2001/133757* (2013.01); *G02F 2001/136218* (2013.01); *G02F 2001/136222* (2013.01); *G02F 2201/121* (2013.01); *G02F 2201/123* (2013.01); *G02F 2201/56* (2013.01)

(56) References Cited

U.S. PATENT DOCUMENTS

| | | |
|---|---|---|
| 2009/0161048 A1 | 6/2009 | Satake et al. |
| 2011/0001910 A1 | 1/2011 | Fujiyoshi et al. |
| 2013/0077031 A1 | 3/2013 | Kim et al. |
| 2013/0300996 A1 | 11/2013 | Takeuchi et al. |
| 2015/0212377 A1 | 7/2015 | Imaoku et al. |

FOREIGN PATENT DOCUMENTS

| | | |
|---|---|---|
| KR | 10-2006-0016918 A | 2/2006 |
| KR | 10-2008-0078993 A | 8/2008 |
| KR | 10-2009-0036407 A | 4/2009 |
| KR | 10-2014-0091100 A | 7/2014 |

(a)

(b)

CURVED LIQUID CRYSTAL DISPLAY

CROSS-REFERENCE TO RELATED APPLICATIONS

This is a continuation application based on pending application Ser. No. 14/498,430, filed Sep. 26, 2014, the entire contents of which is hereby incorporated by reference.

Korean Patent Application No. 10-2013-0167557, filed on Dec. 30, 2013, in the Korean Intellectual Property Office, and entitled: "Curved Liquid Crystal Display," is incorporated by reference herein in its entirety.

BACKGROUND

1. Field

Embodiments relate to a curved liquid crystal display.

2. Description of the Related Art

A liquid crystal display, which is one type of flat panel display, may include two sheets of display panels with field generating electrodes (such as a pixel electrode, a common electrode, or the like) and a liquid crystal layer interposed therebetween. The liquid crystal display device may generate an electric field in the liquid crystal layer by applying voltage to the field generating electrodes, and may determine or affect a direction of liquid crystal molecules of the liquid crystal layer by the generated electric field, thus controlling polarization of incident light so as to display images. Transmittance of the liquid crystal display may be increased as the liquid crystal molecules are effectively controlled.

The above information disclosed in this Background section is only for enhancement of understanding of the background of the invention and therefore it may contain information that does not form the prior art that is already known in this country to a person of ordinary skill in the art.

SUMMARY

Embodiments are directed to a curved liquid crystal display.

The embodiments may be realized by providing a curved liquid crystal display including a first substrate having a curved shape; a plurality of gate lines and a plurality of data lines on the first substrate; a plurality of thin film transistors connected to the plurality of gate lines and the plurality of data lines; a plurality of color filters on the plurality of thin film transistors; a plurality of pixel electrodes and common electrodes on the plurality of color filters, the plurality of pixel electrodes and common electrodes overlapping with each other with a first insulating layer therebetween; a second substrate having a curved shape, the second substrate facing the first substrate; vertical alignment layers on inner sides of the first substrate and the second substrate; and a liquid crystal layer between the vertical alignment layers, wherein liquid crystal molecules of the liquid crystal layer are aligned to be vertical to surfaces of the first substrate and the second substrate when an electric field is not formed.

The liquid crystal molecules may be aligned to be horizontal to the surfaces of the first substrate and the second substrate and in the direction of the electric field, when the electric field is formed in the liquid crystal layer.

The common electrode may be on the plurality of color filters, the first insulating layer may be on the common electrode, and the plurality of pixel electrodes may be on the first insulating layer.

The curved liquid crystal display may further include a light blocking member on the second substrate and at a position overlying a region where two adjacent color filters of the plurality of color filters overlap with each other.

A width of the light blocking member may be the same as or larger than a width of the data line.

The curved liquid crystal display may further include a column spacer attached to the light blocking member.

A portion of the color filters where the plurality of color filters overlaps with each other may have a flat shape.

The curved liquid crystal display may further include a shielding electrode on the first substrate, the shielding electrode being at a position overlying an interface between two adjacent color filters of the plurality of color filters and the data line; and an additional electrode on the second substrate.

The curved liquid crystal display may further include a column spacer attached onto the shielding electrode.

The plurality of pixel electrodes may be on the plurality of color filters, the first insulating layer may be on the pixel electrode, and the common electrode may be on the first insulating layer.

The curved liquid crystal display may further include a light blocking member on the second substrate and at a position overlying a region where two adjacent color filters among the plurality of color filters overlap with each other.

A width of the light blocking member may be the same as or larger than a width of the data line.

The curved liquid crystal display may further include a column spacer attached onto the light blocking member.

A portion of the color filters where the plurality of color filters may overlap with each other has a flat shape.

The curved liquid crystal display may further include a light blocking member between two adjacent color filters among the plurality of color filters, the light blocking member being on the first substrate and at a position overlying the data line.

The curved liquid crystal display may further include a column spacer attached onto the light blocking member.

The embodiments may be realized by providing a curved liquid crystal display including a first substrate having a curved shape; a plurality of common electrodes and a plurality of pixel electrodes on the first substrate, the plurality of common electrodes and plurality of pixel electrodes being alternately separated from each other and being on a same layer; a second substrate having a curved shape, the second substrate facing the first substrate; vertical alignment layers on inner sides of the first substrate and the second substrate; and a liquid crystal layer between the vertical alignment layers, wherein liquid crystal molecules of the liquid crystal layer are aligned to be vertical to surfaces of the first substrate and the second substrate when an electric field is not formed.

The liquid crystal molecules may be aligned to be horizontal to the surfaces of the first substrate and the second substrate in the direction of the electric field, when the electric field is formed in the liquid crystal layer.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
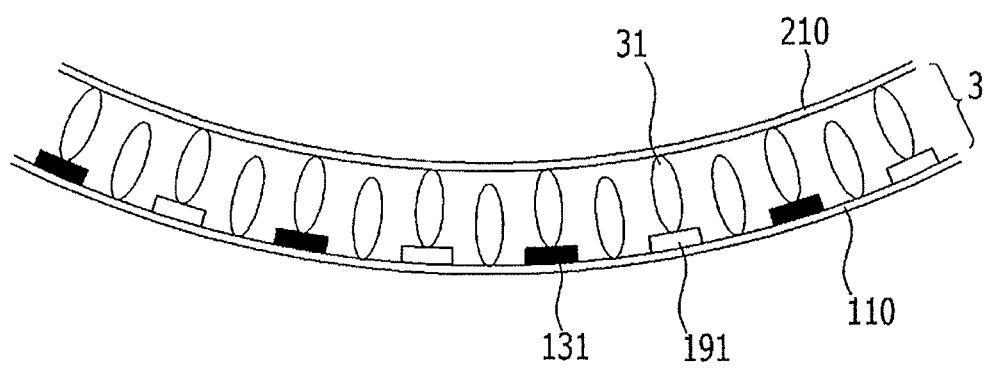
FIG. 1 illustrates a schematic diagram of a liquid crystal display according to an exemplary embodiment.
Figure 1:
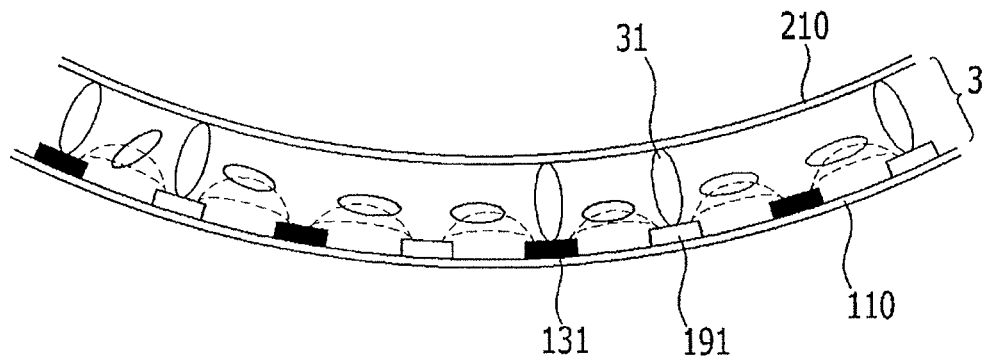

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a liquid crystal display according to an exemplary embodiment will be described in detail with reference to FIG. 1.

FIG. 1 illustrates a schematic diagram of a liquid crystal display according to an exemplary embodiment.

As illustrated in FIG. 1, the liquid crystal display according to the exemplary embodiment may include a lower insulation substrate 110, a plurality of common electrodes 131 and pixel electrodes 191 on the lower insulation substrate 110, an upper insulation substrate 210 facing the lower insulation substrate 110, and a liquid crystal layer 3 between the upper insulation substrate 210 and the lower insulation substrate 110.

The liquid crystal layer 3 may be formed in an in-plane switching mode, which may be driven by only an electric field of the common electrode 131 and the pixel electrode 191 on the lower insulation substrate 210.

FIG. 1(a) illustrates an off state of the liquid crystal display, and FIG. 1(b) illustrates an on state of the liquid crystal display.

As illustrated in FIG. 1(a), liquid crystal molecules 31 (configuring the liquid crystal layer 3) may be in a vertically aligned state when the liquid crystal display is in the off state. As illustrated in FIG. 1(b), liquid crystal molecules 31 (configuring the liquid crystal layer 3) may be driven in an in-plane switching mode by the electric field of the plurality of common electrodes 131 and pixel electrodes 191 (formed only on the lower insulation substrate 210) when the liquid crystal display is turned on.

After the liquid crystal inside the liquid crystal display is manufactured in a vertical field mode, when the liquid crystal display is processed in a curved shape, there may be no large change in behavior of the liquid crystal molecules due to misalignment of the upper insulation substrate 210 and the lower insulation substrate 110.

However, in the case where the liquid crystal inside the liquid crystal display is manufactured in the in-plane switching mode, when the liquid crystal display is processed in a curved shape, there may be a large change in behavior of the liquid crystal molecules due to misalignment of the upper insulation substrate 210 and the lower insulation substrate 110. As a result, light leakage may occur to a greater degree, as compared with the vertical field mode. Accordingly, an initial alignment of the liquid crystal molecules 31 (configuring the liquid crystal layer 3) when the liquid crystal display is in the off state may be formed in a vertical alignment to prevent the light leakage.

Further, when the liquid crystal display is in the on state, the liquid crystal display may be implemented in an existing in-plane switching mode. For example, according to an embodiment, in an off state, the initial alignment of the liquid crystal molecules 31 of the liquid crystal layer 3 may be perpendicular to a tangent of the curved substrate 110 or 210. In an on state, the alignment of a liquid crystal molecule 31 that is under the influence of the electric filed may be horizontal to the surface of the curved substrate 110 or 210, e.g., the liquid crystal molecule 31 may be parallel with a tangent line of the curved substrate 110 or 210.

Next, a liquid crystal display according to an exemplary embodiment will be described in detail with reference to FIGS. 2 to 4.

Figure 2:
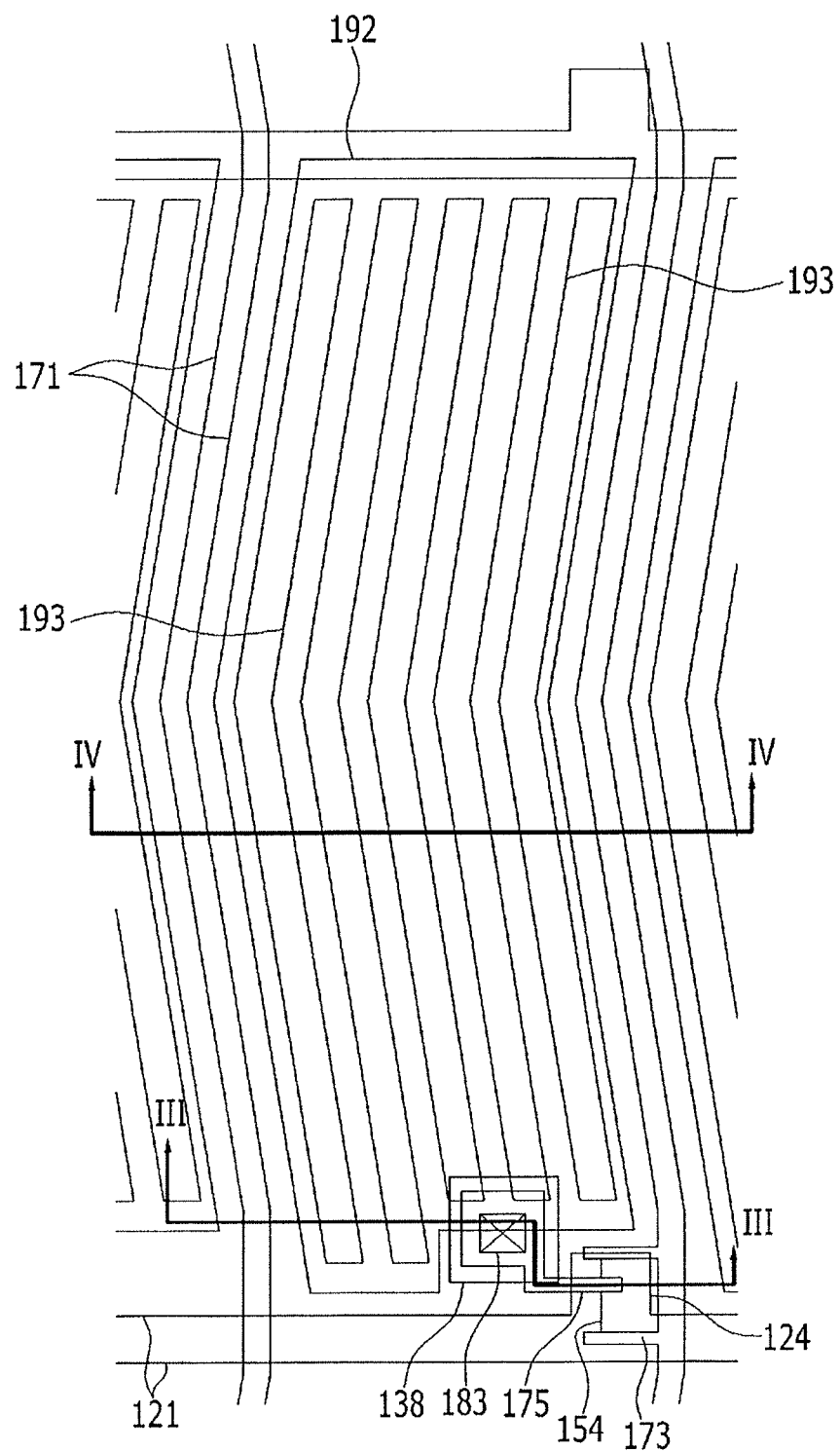
FIG. 2 illustrates a layout view of the liquid crystal display according to the exemplary embodiment.

FIG. 2 illustrates a layout view of a liquid crystal display according to an exemplary embodiment. FIG. 3 illustrates a cross-sectional view taken along line of FIG. 2, and FIG. 4 illustrates a cross-sectional view taken along line IV-IV of FIG. 2.

The liquid crystal display according to the exemplary embodiment may include a lower panel 100 and an upper panel 200 facing each other, and a liquid crystal layer 3 between the two panels 100 and 200.

First, the lower panel 100 will be described.

A plurality of gate lines 121 may be formed on an insulation substrate 110.

The gate lines 121 may transfer gate signals and may extend in a horizontal direction. Each gate line 121 may include a plurality of gate electrodes 124.

A gate insulating layer 140 may be formed on the gate line 121. The gate insulating layer 140 may be made of or may include, e.g., an inorganic insulator such as silicon nitride (SiNx) or silicon oxide (SiOx).

A plurality of semiconductors 151 may be formed on the gate insulating layer 140. The semiconductor 151 may include a protrusion 154 extending along the gate electrode 124. In an implementation, the semiconductor 151 may be disposed only on the gate electrode 124.

A plurality of ohmic contacts 161, 163, and 165 may be formed on the semiconductor 151. The ohmic contacts 163 and 165 may face each other based on the gate electrode 124 and may be disposed on the semiconductor 154 to make a pair. The ohmic contacts 161, 163, and 165 may be made of a material, e.g., $n^+$ hydrogenated amorphous silicon (in which an n-type impurity such as phosphorus is doped at high concentration) or a silicide. In an implementation, the ohmic contacts 161, 163, and 165 may be omitted.

Data conductors, including a plurality of data lines 171 and a plurality of drain electrodes 175, may be positioned on the ohmic contacts 161, 163, and 165.

The data lines 171 may transfer data signals and may extend in a vertical direction to cross the gate lines 121. Each data line 171 may include a plurality of source electrodes 173 that extend toward the gate electrode 124. The data line 171 may be periodically curved and may form an oblique angle with an extending direction of the gate line 121. The oblique angle between the data line 171 and the extending direction of the gate line 121 may be about 45° or more. In an implementation, the data line 171 may extend in a straight line.

The drain electrode 175 may include a rod-shaped end portion that faces the source electrode 173, based on the gate electrode 124 and the other wide end portion.

The gate electrode 124, the source electrode 173, and the drain electrode 175 may form a thin film transistor (TFT), which is a switching element, together with the semiconductor protrusion 154. A semiconductor stripe 151 may have almost the same planar shape as the data line 171, the drain electrode 175, and the ohmic contacts 161 and 165 therebelow, except for the semiconductor protrusion 154 where the thin film transistor is positioned.

A first passivation layer 180x may be positioned on the data conductors 171 and 175 and the exposed semiconductor protrusion 154. The first passivation layer 180x may be made of or may include, e.g., an organic insulating material, an inorganic insulating material, or the like.

A plurality of color filters 230A, 230B, and 230C may be disposed on the first passivation layer 180x. Each of the color filters 230A, 230B, and 230C may uniquely display one of the primary colors, and an example of the primary colors may include three primary colors such as red, green, and blue, or yellow, cyan, magenta, and the like. Although not illustrated, the color filters may further include a color filter displaying a mixed color of the primary colors or white other than the primary colors. The color filters 230A, 230B, and 230C may be made of or may include organic materials. Each of the color filters 230A, 230B, and 230C may be elongated along the data line 171, and two color filters 230A and 230B, or 230B and 230C, which are adjacent to each other on a boundary of the data line 171, may be overlapped with each other.

A plurality of common electrodes 131 may be disposed on the color filters 230A, 230B, and 230C. The common electrode 131 may be made of or may include a transparent conductive material such as ITO or IZO. The common electrode 131 (e.g., having a planar shape) may be formed on an entire surface of the insulation substrate 110 in a whole plate, and may have an opening 138 in a region corresponding to or overlying a periphery of the drain electrode 175.

A second passivation layer 180y may be disposed on the common electrode 131. The second passivation layer 180y may be made of or may include an organic insulating material or an inorganic insulating material.

A pixel electrode 191 may be formed on the second passivation layer 180y. The pixel electrode 191 may include a plurality of branch electrodes 193 (which may extend to be substantially parallel with each other and may be spaced apart from each other), and lower and upper horizontal portions 192 connecting upper and lower ends of the branch electrodes 193. The branch electrode 193 of the pixel electrode 191 may be curved along the data line 171. In an implementation, the data lines 171 and the branch electrode 193 of the pixel electrode 191 may extend in a straight line. The pixel electrode 191 may be made of or may include a transparent conductive material such as ITO or IZO.

A plurality of contact holes 183 (exposing a part of the drain electrode 175) may be formed in the first passivation layer 180x, the color filter 230B, and the second passivation layer 180y, and the pixel electrode 191 may be electrically connected with the drain electrode 175 through the contact hole 183 to receive a data voltage.

The contact hole 183 may be formed at a position corresponding to or aligned with the opening 138 in the common electrode 131.

The pixel electrode 191 (receiving the data voltage) may generate an electric field in the liquid crystal layer 3 together with the common electrode 131 (receiving a common voltage).

The branch electrodes 193 of the pixel electrode 191 may overlap with the common electrode 131 (which may have the planar shape).

A first alignment layer 11 may be coated on an inner surface of the lower panel 100.

Next, the upper panel 200 will be described.

The upper panel 200 may include an insulation substrate 210, and a light blocking member 220 on the insulation substrate 210. An overcoat 250 may be further formed on the light blocking member 220.

A width of the light blocking member 220 may be larger than a width of the data line 171.

A second alignment layer 21 may be coated on the overcoat 250.

The first alignment layer 11 and the second alignment layer 21 may be vertical alignment layers for vertically aligning the liquid crystal molecules 31 inside the liquid crystal layer 3.

The liquid crystal layer 3 between the lower panel 100 and the upper panel 200 may include liquid crystal molecules 31. The liquid crystal molecules 31 may be aligned so that long axes thereof are vertical or perpendicular to the surfaces of the two panels 100 and 200 when an electric field is not applied.

The liquid crystal layer 3 may have positive dielectric anisotropy or may have negative dielectric anisotropy. The liquid crystal molecules of the liquid crystal layer 3 may be aligned to have pretilts in a predetermined direction, and the pretilt directions of the liquid crystal molecules may be changed according to dielectric anisotropy of the liquid crystal layer 3.

As noted above, after the liquid crystal inside the liquid crystal display is manufactured in a vertical field mode, when the liquid crystal display is processed in a curved shape, there may be no large change in behavior of the liquid crystal molecules due to misalignment of the upper insulation substrate 210 and the lower insulation substrate 110.

In the case where the liquid crystal inside the liquid crystal display is manufactured in the in-plane switching mode, when the liquid crystal display is processed in a curved shape, there may be a large change in behavior of the liquid crystal molecules due to misalignment of the upper insulation substrate 210 and the lower insulation substrate 110. As a result, light leakage may more frequently occur, as compared with the vertical field mode. Accordingly, an initial alignment of the liquid crystal molecules 31 (configuring the liquid crystal layer 3) when the liquid crystal display is in the off state may be formed in a vertical alignment to prevent the light leakage.

A backlight unit (not illustrated) that generates light to supply the light to the two panels 100 and 200 may be further included at an outside of the substrate 110 of the lower panel 100.

The pixel electrode 191 (to which the data voltage is applied) may generate an electric field in the liquid crystal layer 3 together with the common electrode 131 (receiving the common voltage) to determine or affect directions of the liquid crystal molecules of the liquid crystal layer 3 and may display the corresponding image.

Next, a liquid crystal display according to another exemplary embodiment will be described in detail with reference to FIG. 5.

Figure 5:
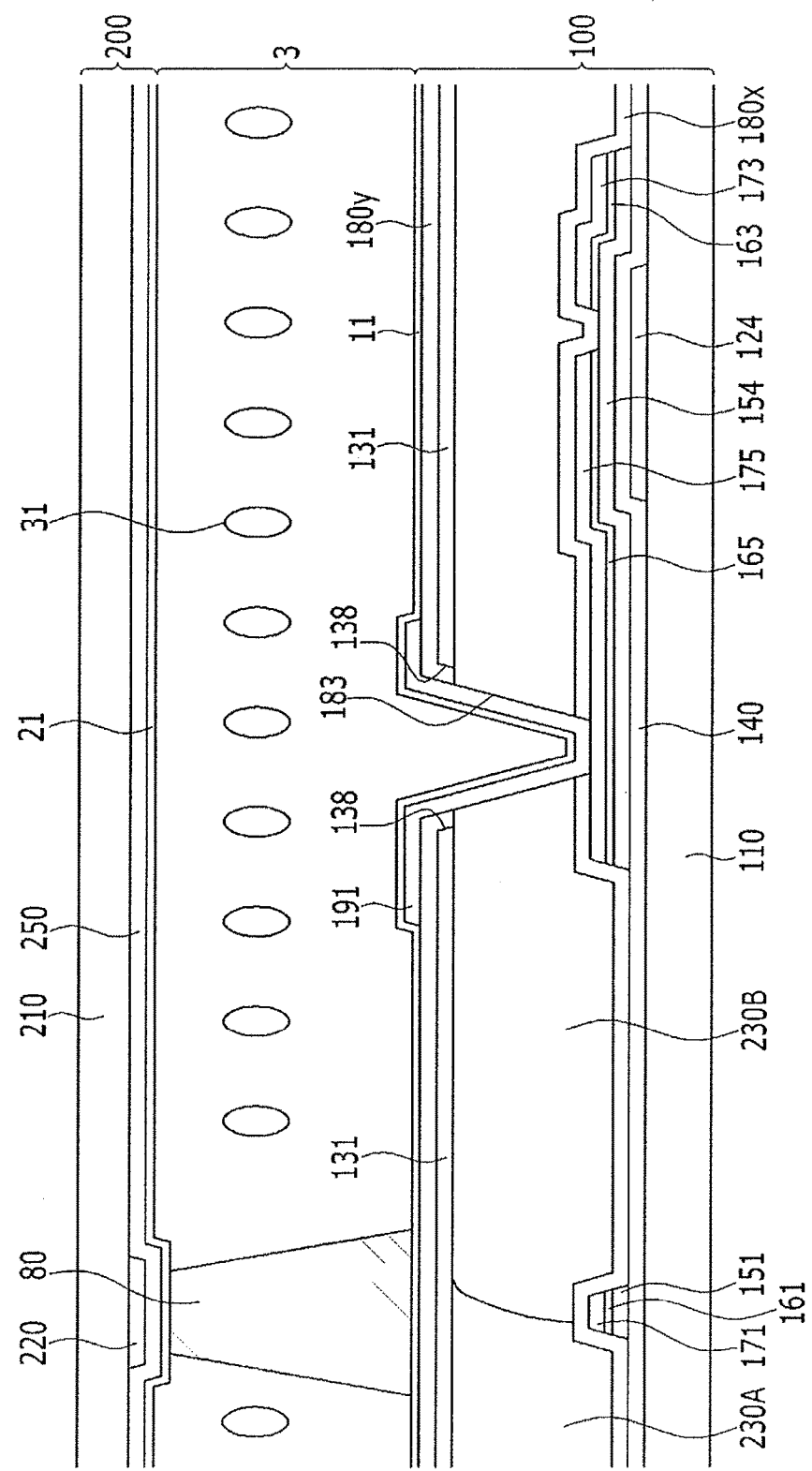
FIG. 5 illustrates a cross-sectional view of a liquid crystal display according to another exemplary embodiment, which is taken along line of FIG. 2.

FIG. 5 illustrates a cross-sectional view of a liquid crystal display according to another exemplary embodiment, which is taken along line of FIG. 2.

Figure 4:
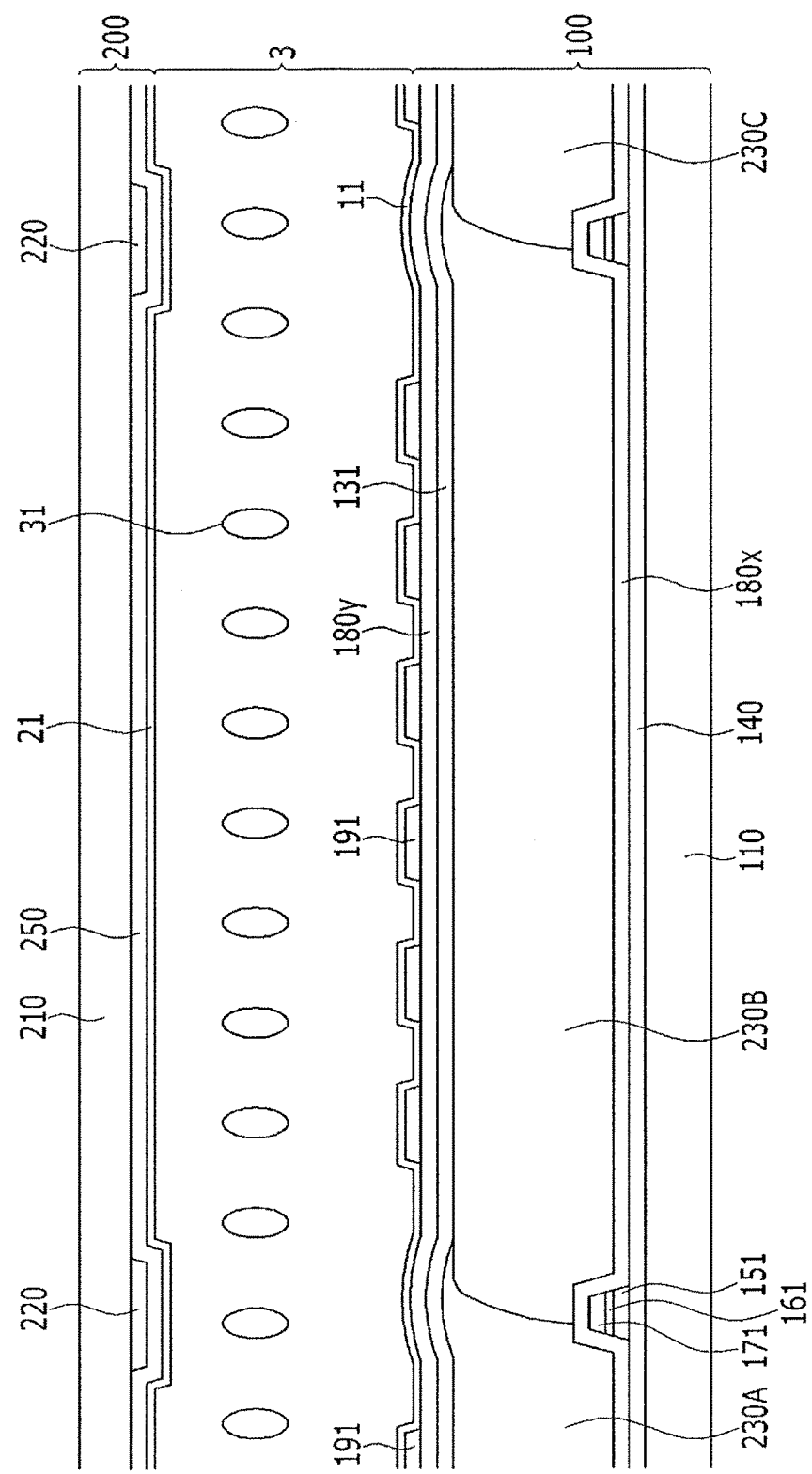
FIG. 4 illustrates a cross-sectional view taken along line IV-IV of FIG. 2.

The liquid crystal display according to the exemplary embodiment illustrated in FIG. 5 may be substantially the same as the liquid crystal display according to the exemplary embodiment illustrated in FIG. 4, except for a column spacer 80 and shapes of surfaces of color filters 230A, 230B, and 230C on a lower surface of the column spacer 80, and description for duplicated portions may be omitted.

The liquid crystal display according to another exemplary embodiment may further include a column spacer 80 attached to or on a top of the light blocking member 220 (which is on the upper panel 200), unlike the liquid crystal display according to the exemplary embodiment illustrated in FIG. 4.

Further, an overlapping portion of the color filters 230A and 230B below or underlying the column spacer 80 may have a flat shape, unlike protruding in a convex shape above the lower panel 100 in the liquid crystal display according to the exemplary embodiment illustrated in FIGS. 2 to 4. For example, upper or outer surfaces of the color filters the color filters 230A and 230B below or underlying the column spacer 80 may be flat and may be parallel or coplanar with one another.

The column spacer 80 may support the upper panel 200 and the lower panel 100 to help maintain a predetermined cell gap between the upper panel 200 and the lower panel 100.

When the curved liquid crystal display is manufactured, respective constituent elements of the upper panel 200 and the lower panel 100 may correspond to different positions from initially formed positions because the liquid crystal display is bent in a curved shape.

The upper panel 200 and the lower panel 100 may be bent in a curved shape, and the column spacer 80 attached to the upper panel 200 may correspond to or overlie a different position on the lower panel 100 from the initial corresponding or overlying position of the lower panel 100. As a result, the column spacer 80 may overlap with the color filters 230A, 230B, and 230C to be disposed over a convex portion above the lower panel 100 or a slope portion thereof. In this case, the initially formed cell gap and a cell gap after completing the curved liquid crystal display may be different from each other, and as a result, a luminance characteristic may deteriorate.

In order to help prevent the deterioration of the luminance characteristic, in the case where the column spacer 80 is attached to or on the upper panel 200, the overlapping portions 230A and 230B or 230B and 230C of the color filters 230A, 230B, and 230C on the lower panel 100 facing the upper panel 200 may have a flat shape.

A liquid crystal display according to yet another exemplary embodiment will be described in detail with reference to FIG. 6.

Figure 6:
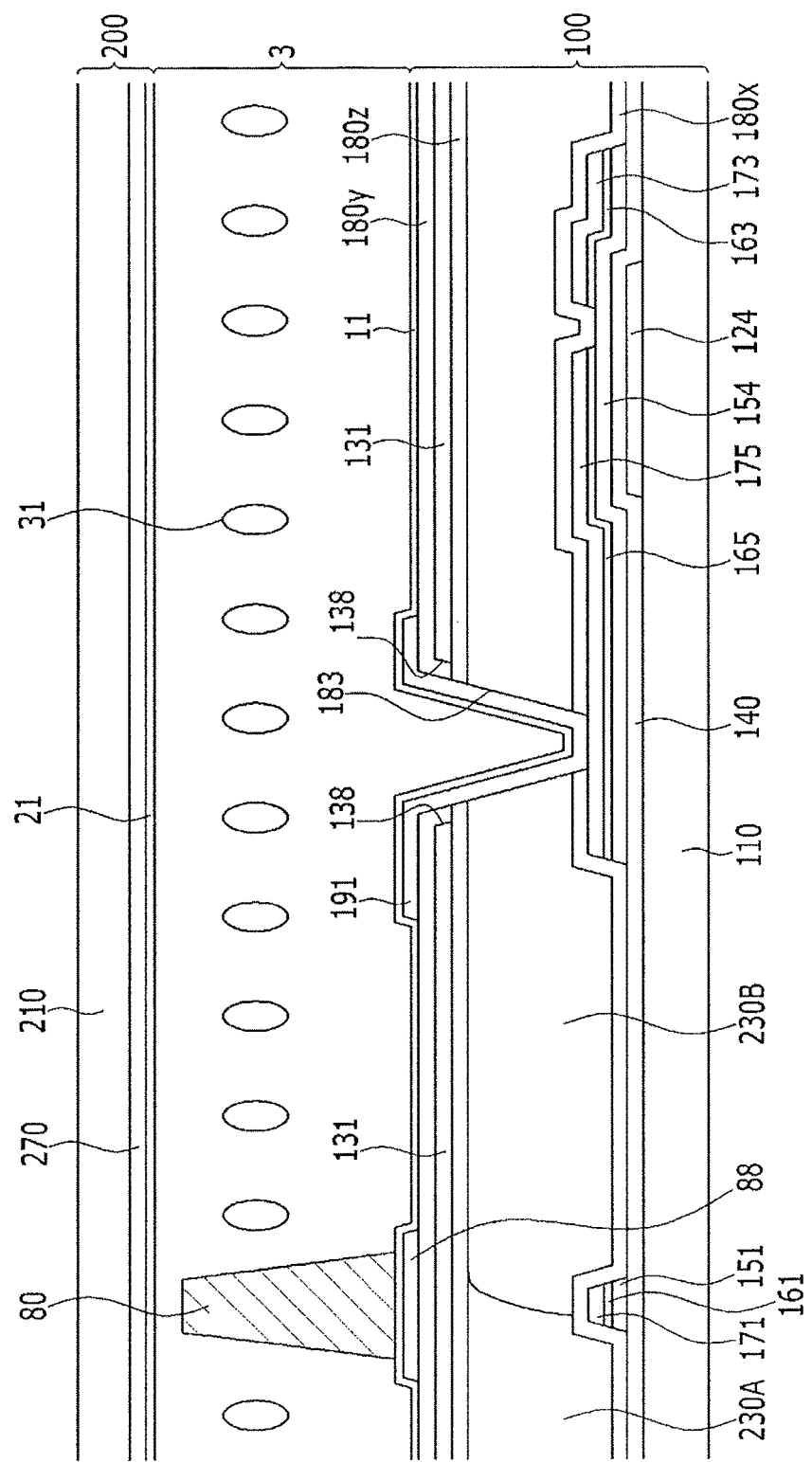
FIG. 6 illustrates a cross-sectional view of a liquid crystal display according to yet another exemplary embodiment, which is taken along line of FIG. 2.

FIG. 6 illustrates a cross-sectional view of a liquid crystal display according to yet another exemplary embodiment, which is taken along line of FIG. 2.

Figure 3:
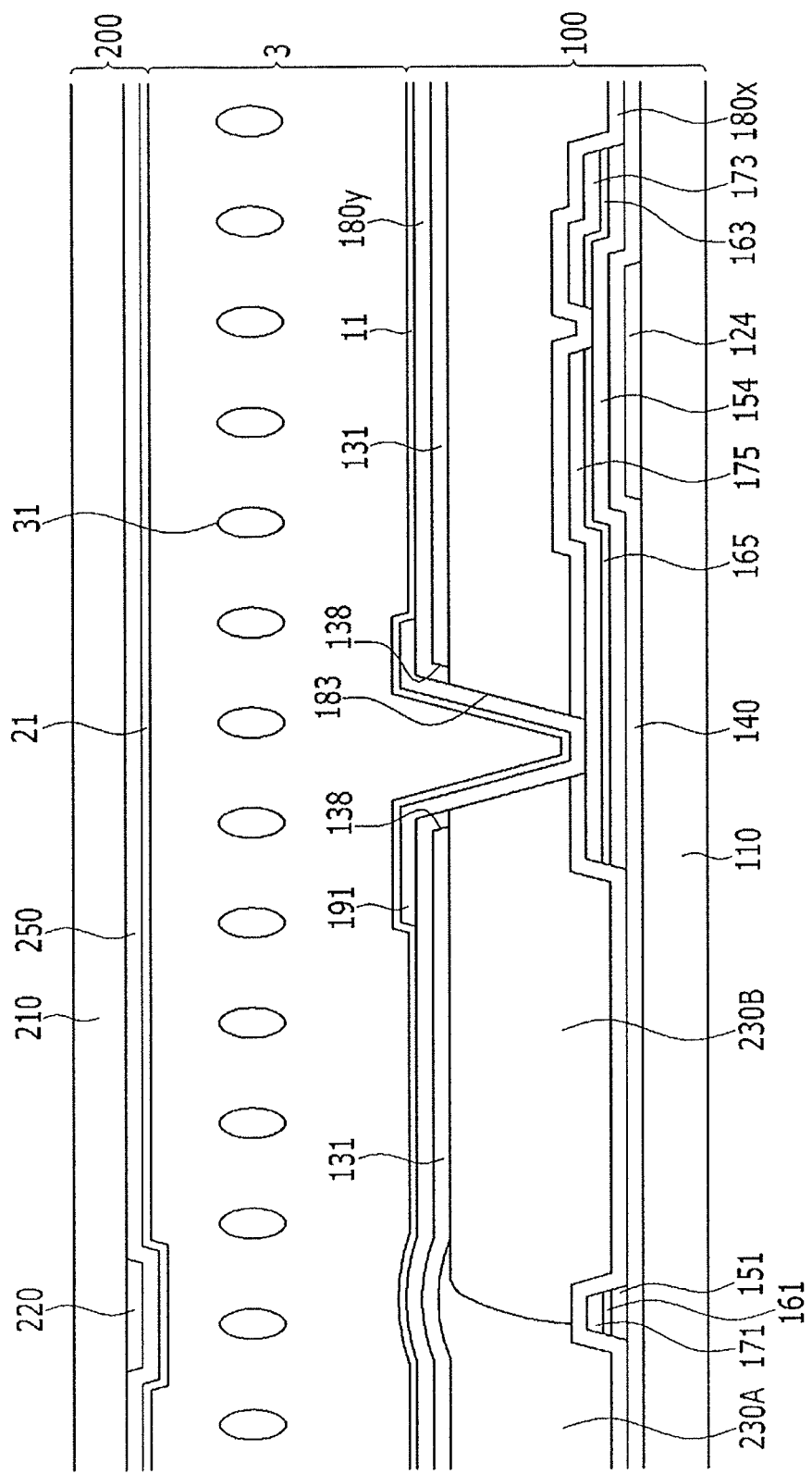
FIG. 3 illustrates a cross-sectional view taken along line of FIG. 2.

The liquid crystal display according to the exemplary embodiment illustrated in FIG. 6 is substantially the same as the liquid crystal display according to the exemplary embodiment illustrated in FIGS. 2 to 4 described above, except for a column spacer 80 and a shielding electrode 88 positioned on a lower surface of the column spacer 80, and description for duplicated portions may be omitted.

In the liquid crystal display according to yet another exemplary embodiment illustrated in FIG. 6, a shielding electrode 88 may be disposed on the data line 171, unlike the liquid crystal display according to the exemplary embodiment illustrated in FIGS. 2 to 4. The shielding electrode 88 may be positioned at both sides on the data line 171 along an edge of one pixel area. The shielding electrode 88 may include vertical portions on edges of the pixel area, and a horizontal portion connecting the vertical portions.

The shielding electrodes may not be separated from each other for every pixel area, and may be connected to the entire adjacent pixels to be integrally formed. For example, the vertical portions of the pixel electrode at the edges, and one or more horizontal portions connecting the vertical portions, may exist for every pixel area, and the shielding electrodes may have a mesh form in all the pixels.

The shielding electrode 88 may be made of or may include a transparent conductive material such as indium tin oxide (ITO) or indium zinc oxide (IZO), or a reflective metal such as aluminum, silver, chromium, or an alloy thereof.

Further, an additional electrode 270 may be disposed on the upper panel 200 to apply the same voltage as the additional electrode 270 of the upper panel 200 to the shielding electrode 88, and the same voltage may be applied between both electrodes. As a result, an electric field may not be generated between the shielding electrode 88 and the additional electrode 270 of the upper panel 200, and the liquid crystal layer positioned therebetween may not be aligned. In this case, the liquid crystal between the shielding electrode 88 and the additional electrode 270 of the upper panel 200 may be in a black state, and as a result, in the case where the liquid crystal expresses black, the liquid crystal itself may serve as the light blocking member 220. Accordingly, in the liquid crystal display according to yet another exemplary embodiment, the light blocking member 220 of the upper panel 200 may be omitted, unlike the liquid crystal display illustrated in FIGS. 2 to 4.

Further, the liquid crystal display according to yet another exemplary embodiment may further include a third passivation layer 180z between the color filters 230A, 230B, and 230C and the common electrode 131. The third passivation layer 180z may be made of or may include an organic material, and may have a flat surface. The third passivation layer 180z may be between the adjacent pixels to help reduce a step due to the color filters 230A, 230B, and 230C, and may help the alignment layer 11 to be uniformly rubbed. Further, the third passivation layer 180z may be an inorganic insulating layer, and may help prevent components of the color filters from being exposed outside, and in this case, the third passivation layer 180z may be formed at a lower temperature than the gate insulating layer 140 to help prevent the color filters 230A, 230B, and 230C therebelow from being deformed or discolored. The third passivation layer 180z may help reduce transmittance loss due to a difference in refractive index between the color filters (disposed therebelow) and the organic insulating layer.

The liquid crystal display according to yet another exemplary embodiment may further include a column spacer 80 attached to or on a position corresponding to or overlying the shielding electrode 88 on the lower panel 100, unlike the liquid crystal display according to the exemplary embodiment illustrated in FIGS. 2 to 4.

When the curved liquid crystal display is manufactured, respective constituent elements of the upper panel 200 and the lower panel 100 may correspond to different positions from initially formed positions because the liquid crystal display may be realigned or misaligned in a curved shape.

If the light blocking member 220 is formed on the upper panel 200, and the upper panel 200 and the lower panel 100 are bent in a curved shape, the column spacer 80 (attached to the lower panel 100) may correspond to a different position from the initial corresponding position of the upper panel 200. Accordingly, the column spacer 80 may be disposed over the protrusion where the light blocking member 220 positioned on the upper panel 200 is positioned or positioned at the contact hole portion, and in this case, the initially formed cell gap and a cell gap after completing the curved liquid crystal display may be different from each other, and as a result, a luminance characteristic may deteriorate.

Further, if the light blocking member 220 is formed on the upper panel 200, and the upper panel 200 and the lower panel 100 are bent in a curved shape, the column spacer 80 attached to the lower panel 100 may correspond to a different position from the initial corresponding position of the upper panel 200. Accordingly, the light blocking member 220 may be positioned at an undesired position to cover the display area, and in this case, an aperture ratio may be decreased.

The removing or omission of the light blocking member 220 formed on the upper panel 200 and the forming of the shielding electrode 88 on the lower panel may help prevent the luminance characteristic from deteriorating due to a change of the cell gap or reduction of the aperture ratio of the liquid crystal display by an effect of the light blocking member 220 and the column spacer 80, by removing or omitting the light blocking member 220 on the upper panel 200 facing the lower panel 100 in the case where the column spacer 80 is attached to the lower panel 100.

Figure 8:
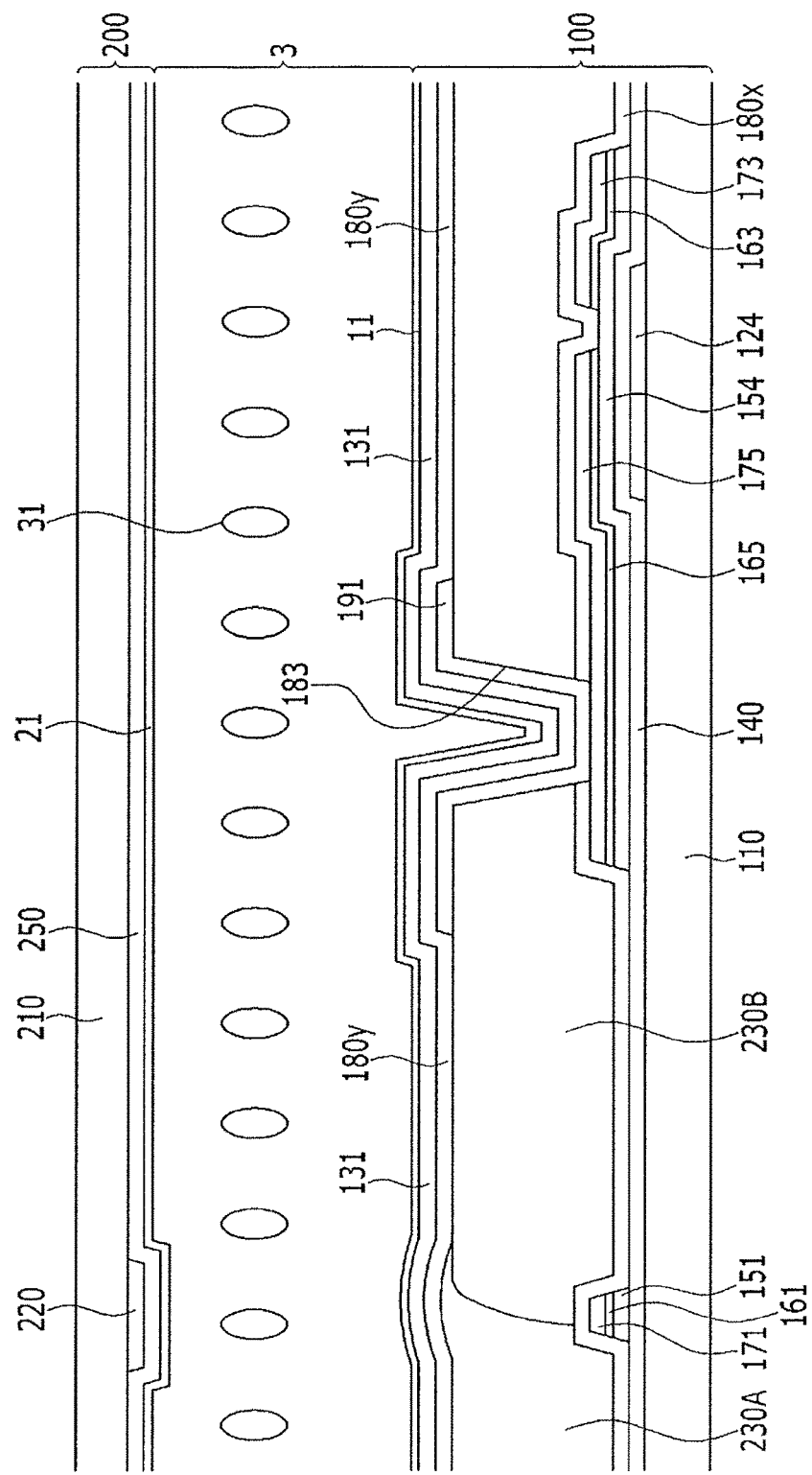
FIG. 8 illustrates a cross-sectional view taken along line IX-IX of FIG. 7.
Figure 9:
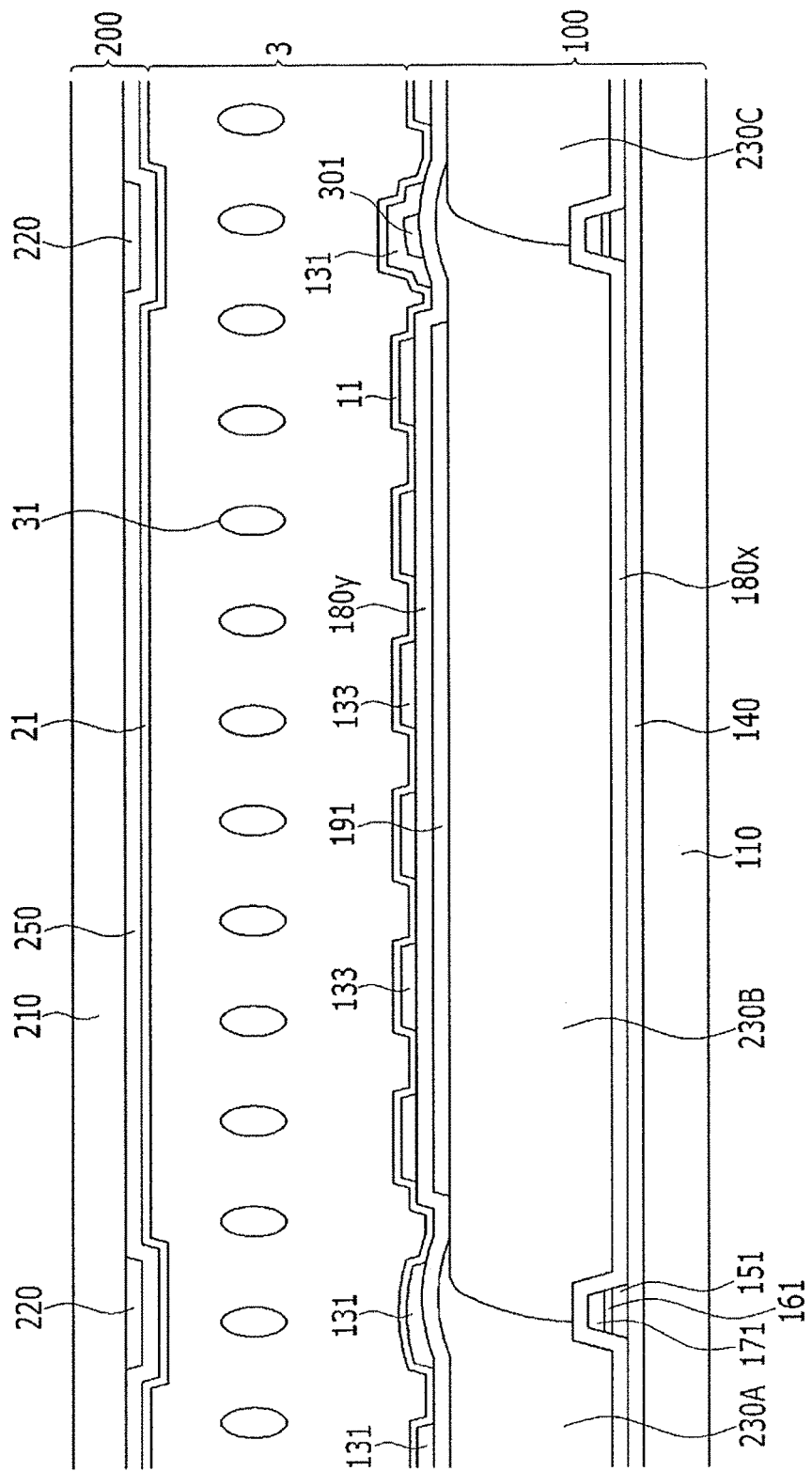
FIG. 9 illustrates a cross-sectional view taken along line X-X of FIG. 7.

Next, a liquid crystal display according to yet another exemplary embodiment will be described in detail with reference to FIGS. 7 to 9.

Figure 7:
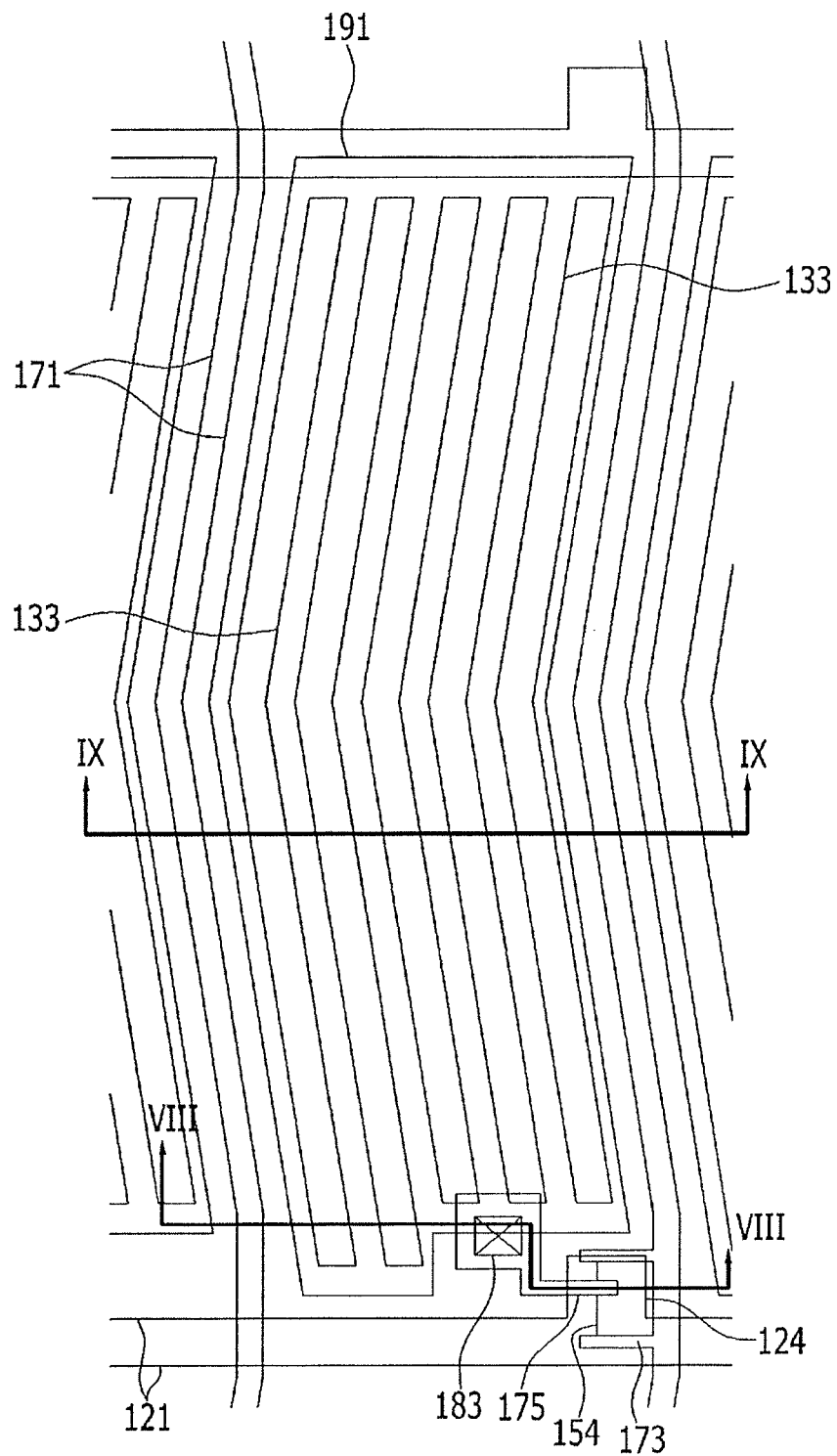
FIG. 7 illustrates a layout view of a liquid crystal display device according to yet another exemplary embodiment.

FIG. 7 illustrates a layout view of a liquid crystal display device according to another exemplary embodiment. FIG. 8 illustrates a cross-sectional view taken along line IX-IX of FIG. 7, and FIG. 9 illustrates a cross-sectional view taken along line X-X of FIG. 7.

The liquid crystal display according to yet another exemplary embodiment may include a lower panel 100 and an upper panel 200 facing each other, and a liquid crystal layer 3 between the two display panels 100 and 200.

First, the lower panel 100 will be described.

A plurality of gate lines 121 (including a plurality of gate electrodes 124) may be positioned on an insulation substrate 110, and a gate insulating layer 140 may be formed on the gate line 121. A plurality of semiconductors 151 (including a plurality of protrusions 154) may be disposed on the gate insulating layer 140, and a plurality of ohmic contacts 161, 163, and 165 may be disposed on the semiconductors 151 and 154. A data conductor (including a plurality of data lines 171 and a plurality of drain electrodes 175) may be positioned on the ohmic contacts 161, 163, and 165. The data line 171 may be periodically curved, and may form an oblique angle with an extending direction of the gate line 121. The oblique angle between the data line 171 and the extending direction of the gate line 121 may be about 45° or more. In an implementation, the data line 171 may extend in a straight line.

A first passivation layer 180x may be positioned on the data conductor 171 and 175 and the exposed semiconductor protrusion 154, and the first passivation layer 180x may be made of or may include an organic insulating material, an inorganic insulating material, or the like.

A plurality of color filters 230A, 230B, and 230C may be disposed on the first passivation layer 180x. Each of the color filters 230A, 230B, and 230C may uniquely display one of the primary colors, and an example of the primary colors may include three primary colors such as red, green, and blue, or yellow, cyan, magenta, and the like. Although not illustrated, the color filters may further include a color filter displaying a mixed color of the primary colors or white other than the primary colors. The color filters 230A, 230B, and 230C may be made of or may include organic materials. Each of the color filters 230A, 230B, and 230C may be elongated along the data line 171, and two of the color filters 230A and 230B, or 230B and 230C (which are adjacent to each other on a boundary of the data line 171) may be overlapped with each other. For example, an edge or portion of one of the color filters may overlap an edge or portion of another of the color filters at the boundary of the data line 171.

A plurality of pixel electrodes 191 may be disposed on the color filters 230A, 230B, and 230C. The pixel electrode 191 may have a planar shape that almost fills a region surrounded by the gate line 121 and the data line 171. An overall shape of the pixel electrode 191 may be generally a polygon having sides that are substantially parallel to the gate line 121 and the data line 171. The pixel electrode 191 may be made of or may include a transparent conductive material such as ITO or IZO.

A plurality of contact holes 183 (exposing a part of the drain electrode 175) may be formed in the first passivation layer 180x and the color filter 230A, and the pixel electrode 191 may be electrically connected with the drain electrode 175 through the contact hole 183 to receive a data voltage.

A second passivation layer 180y may be disposed on the color filters 230A, 230B, and 230C and the pixel electrode 191. The second passivation layer 180y may include an organic insulator or an inorganic insulator.

A common electrode 131 may be disposed on the second passivation layer 180y. The common electrode 131 may be made of or may include a transparent conductive material such as ITO or IZO. The common electrodes 131 of adjacent pixels may be connected to each other. The common electrode 131 may include a plurality of branch electrodes 133 in each pixel area. The branch electrodes 133 may be substantially parallel to each other and may be curved along the data line 171. In an implementation, the data line 171 and the branch electrodes 133 of the pixel electrode 131 may extend in a straight line.

The branch electrodes 133 of the common electrode 131 may overlap with or overlie the pixel electrode 191.

The pixel electrode 191 (receiving the data voltage) may generate an electric field in the liquid crystal layer 3, together with the common electrode 131 (receiving the common voltage).

Next, the upper panel 200 will be described.

The upper panel 200 may include an insulation substrate 210 and a light blocking member 220 on the insulation substrate 210. An overcoat 250 may be further formed on the light blocking member 220.

A width of the light blocking member 220 may be larger than a width of the data line 171.

A second alignment layer 21 may be coated on the overcoat 250.

The first alignment layer 11 and the second alignment layer 21 may be vertical alignment layers for vertically aligning the liquid crystal molecules 31 inside the liquid crystal layer 3.

The liquid crystal layer 3 between the lower panel 100 and the upper panel 200 may include liquid crystal molecules 31, and the liquid crystal molecules 31 may be aligned so that long axes thereof are vertical or perpendicular to the surfaces of the two panels 100 and 200 while an electric field is not applied.

The liquid crystal layer 3 may have positive dielectric anisotropy or may have negative dielectric anisotropy. The liquid crystal molecules of the liquid crystal layer 3 may be aligned to have pretilts in a predetermined direction, and the pretilt directions of the liquid crystal molecules may be changed according to dielectric anisotropy of the liquid crystal layer 3.

As noted above, after the liquid crystal inside the liquid crystal display is manufactured in a vertical field mode, when the liquid crystal display is processed in a curved shape, there may be no large change in behavior of the liquid crystal molecules due to misalignment of the upper insulation substrate 210 and the lower insulation substrate 110.

In the case where the liquid crystal inside the liquid crystal display is manufactured in the in-plane switching mode, when the liquid crystal display is processed in a curved shape, there may be a large change in behavior of the liquid crystal molecules due to misalignment of the upper insulation substrate 210 and the lower insulation substrate 110, and as a result, light leakage may more frequently occur, as compared with the vertical field mode. Accordingly, an initial alignment of the liquid crystal molecules 31 (configuring the liquid crystal layer 3) when the liquid crystal display is in the off state may be formed in a vertical alignment to help prevent the light leakage.

A backlight unit (not illustrated) that generates light to supply the light to the two panels 100 and 200 may be further included outside of the substrate 110 of the lower panel 100.

The pixel electrode 191 to which the data voltage is applied may generate an electric field in the liquid crystal layer 3 together with the common electrode 131 (receiving the common voltage) to determine or affect directions of the liquid crystal molecules of the liquid crystal layer 3 and to display the corresponding image.

A liquid crystal display according to yet another exemplary embodiment will be described in detail with reference to FIG. 10.

Figure 10:
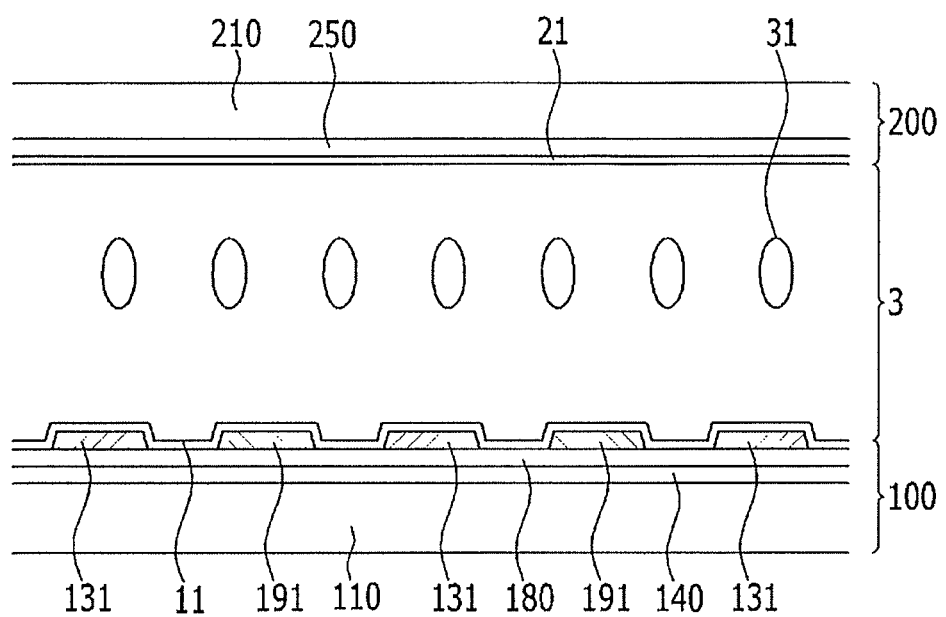
FIG. 10 illustrates a cross-sectional view of a liquid crystal display device according to yet another exemplary embodiment.

FIG. 10 illustrates a cross-sectional view of a liquid crystal display according to yet another exemplary embodiment.

Referring to FIG. 10, the liquid crystal display according to yet another exemplary embodiment may include a lower panel 100 including a thin film transistor, an upper panel 200 facing the lower panel 100, and a liquid crystal layer 3 between the lower panel 100 and the upper panel 200.

The common electrode 131 and the pixel electrode 191 (for forming the electric field) may be formed on the lower panel 100, and the common electrode 131 and the pixel electrode 191 may be formed at various electrode distances in one pixel area. Further, the liquid crystal molecules 31 inside the liquid crystal layer 3 may be vertically aligned on the lower panel 100 and the upper panel 200, when the electric field is not applied.

A plurality of gate lines (not illustrated) may be formed on the insulation substrate 110 (made of transparent glass or plastic), and a plurality of gate electrodes (not illustrated), protruding upwardly and downwardly from each gate line, may be formed. A storage electrode (not illustrated), made of the same material as the gate line, may be further formed on the same layer as the gate line.

A gate insulating layer 140 may be formed on the gate line.

On the gate insulating layer 140, a semiconductor (not illustrated), an ohmic contact (not illustrated), a data line (not illustrated), source/drain electrodes (not illustrated), and the like may be formed, and a passivation layer 180 may be formed thereon.

A plurality of common electrodes 131 and pixel electrodes 191 may be formed at various electrode distances on the passivation layer 180, and a first alignment layer 11 may be formed on the common electrode 131 and the pixel electrode 191.

The upper panel 200 may include an insulation substrate 210 made of transparent glass or plastic. A plurality of color filters (not illustrated) may be formed on the insulation substrate 210, an overcoat 250 may be formed on the color filter, and a second alignment layer 21 may be formed on the overcoat 250.

Here, the first alignment layer 11 and the second alignment layer 21 may be vertical alignment layers. Accordingly, when the electric field is not formed in the liquid crystal display, the liquid crystal molecules 31 may be almost vertical to the surfaces of the upper panel 200 and the lower panel 100.

Further, when the electric field is formed in the liquid crystal display, a vertical field may be formed around the common electrode 131 and the pixel electrode 191, and the liquid crystal molecules 31 may be aligned in an in-plane switching mode in a direction of the electric field.

For example, in order to observe display quality of the curved liquid crystal display according to the exemplary embodiment, light leakage in black and uniformity of luminance on gray were measured. The result is illustrated in FIG. 11.

Figure 11:
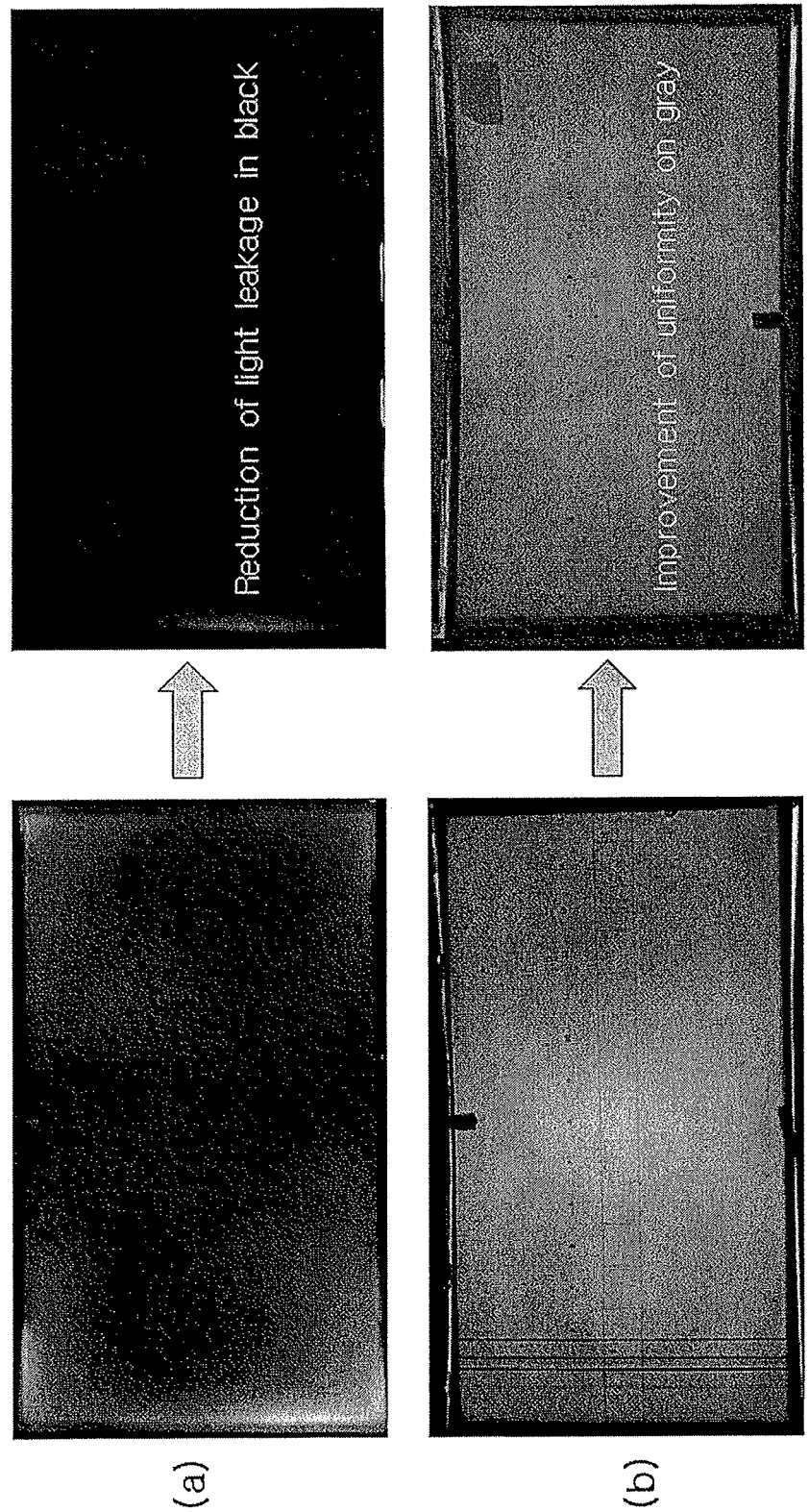
FIG. 11 illustrates a diagram of a result of measuring light leakage in black and uniformity of luminance on gray in curved liquid crystal displays according to an exemplary embodiment and a Comparative Example.

FIG. 11(*a*) illustrates an image obtained by measuring light leakage in black of a curved liquid crystal display according to a Comparative Example and a curved liquid crystal display according to an exemplary embodiment, and FIG. 11(*b*) illustrates an image obtained by measuring uniformity of luminance on gray of a curved liquid crystal display according to a Comparative Example and a curved liquid crystal display according to an exemplary embodiment.

As illustrated in FIGS. 11(a) and 11(b), in the curved liquid crystal display according to the exemplary embodiment, it may be seen that light leakage in black is reduced, and uniformity of luminance on gray is improved.

Figure 12:
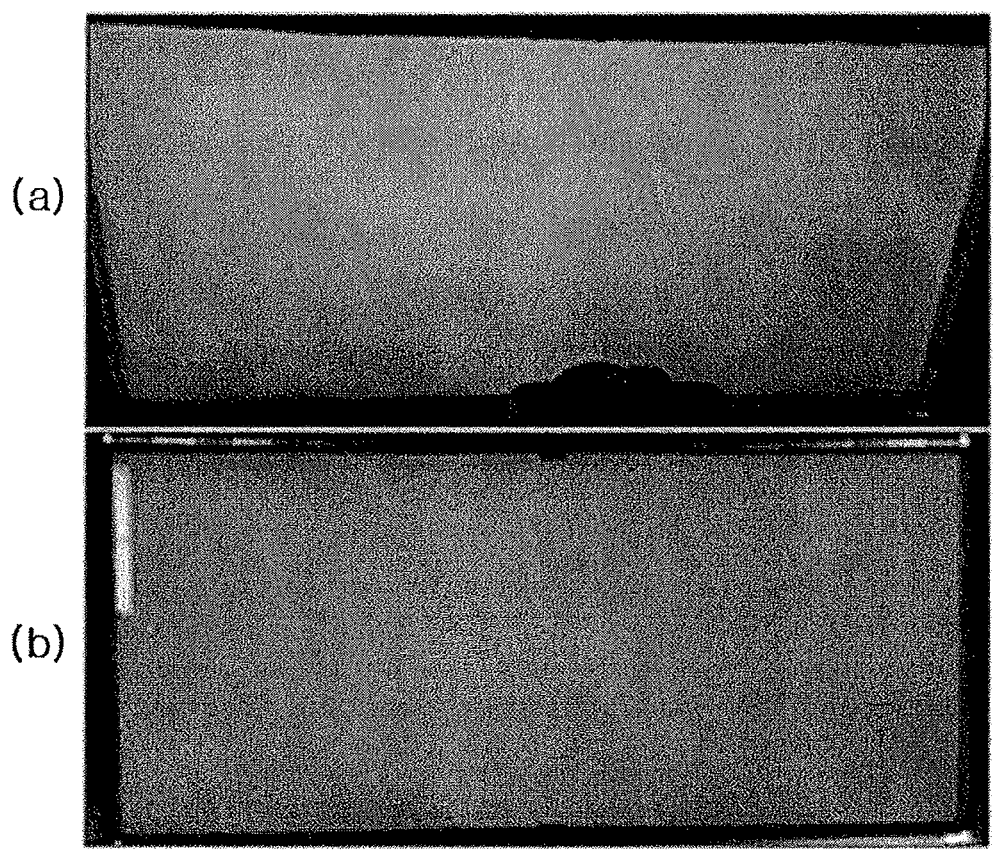
FIG. 12 illustrates a diagram of a result of measuring generation of spots in curved liquid crystal displays according to an exemplary embodiment and Comparative Example.

In order to observe the display quality of the curved liquid crystal display according to the exemplary embodiment, generation of spots of the display device were measured. The result is illustrated in FIG. 12.

FIG. 12(a) illustrates an image obtained by measuring a white driving state of a curved liquid crystal display according to a Comparative Example, and FIG. 12(b) illustrates an image obtained by measuring a white driving state of a curved liquid crystal display according to an exemplary embodiment.

As illustrated in FIGS. 12(a) and 12(b), in the case of the curved liquid crystal display according to the Comparative Example, a yellowish phenomenon was observed at left and right sides of the display device, while in the case of the curved liquid crystal display according to the exemplary embodiment, the yellowish phenomenon was completely improved.

Figure 13:
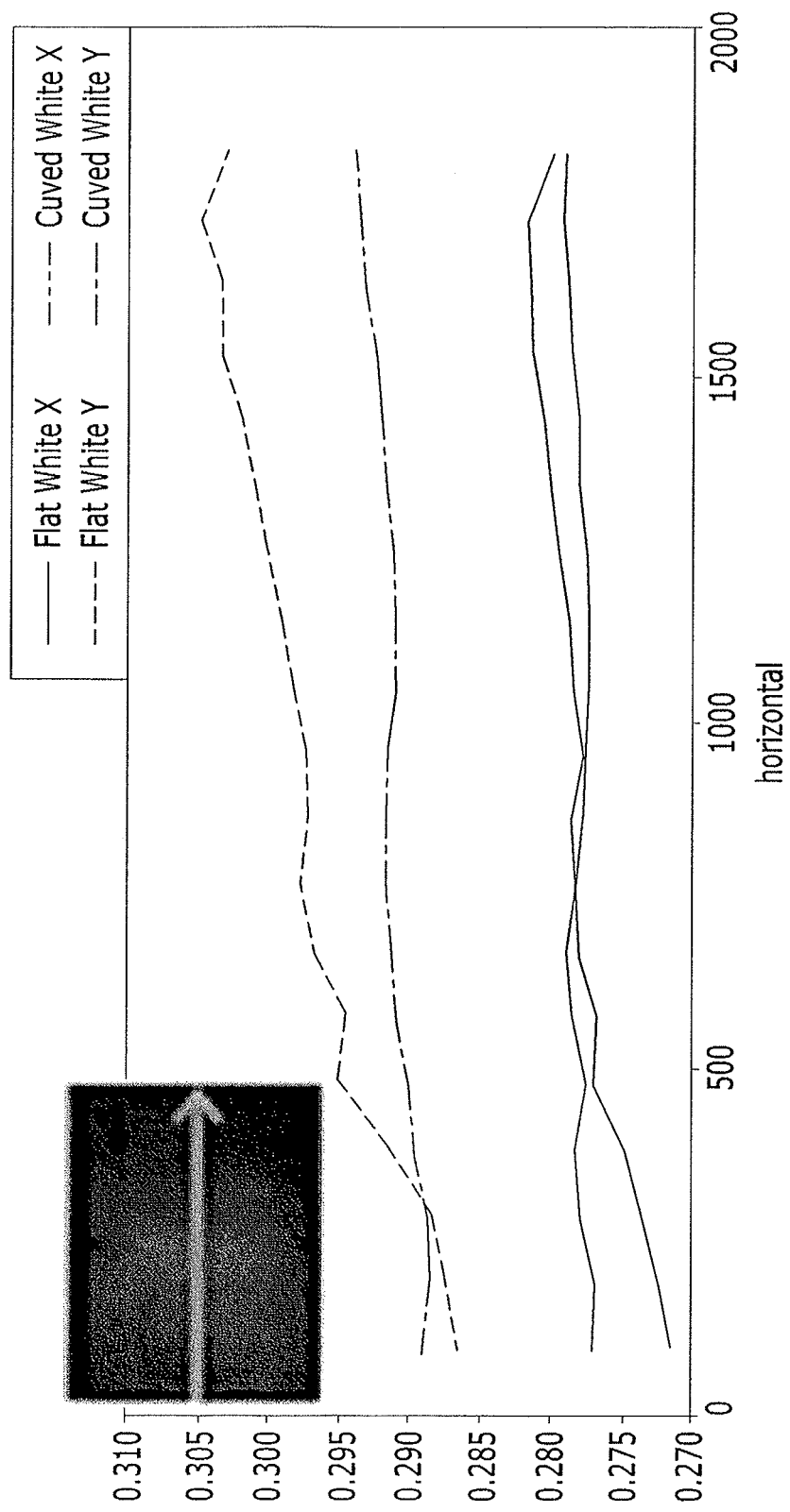
FIG. 13 illustrates a diagram of a result of measuring changes in color coordinates for each position before and after forming a curved surface in a curved liquid crystal display according to an exemplary embodiment.

Further, in order to observe generation of spots of the curved liquid crystal display according to the exemplary embodiment, changes in color coordinates for each position before and after forming the curved shape of the curved liquid crystal display according to the exemplary embodiment were measured, and the result is illustrated in FIG. 13.

As illustrated in FIG. 13, it may be seen that there was little change in color coordinate for each position before and after forming the curved shape of the curved liquid crystal display, and as a result, it may be seen that a spot phenomenon is improved.

Figure 14:
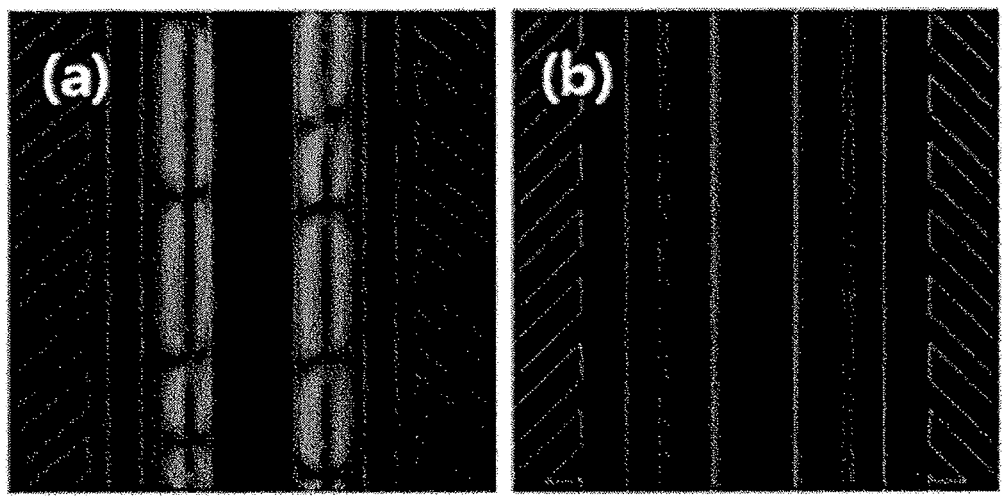
FIG. 14 illustrates a diagram illustrating a result of measuring light leakage in a black state in curved liquid crystal displays according to an exemplary embodiment and Comparative Example.

The light leakage in the black state of the curved liquid crystal display according to the exemplary embodiment was measured, and the result is illustrated in FIG. 14.

FIG. 14(a) illustrates an image showing a simulation result of light leakage of a curved liquid crystal display according to a Comparative Example, and FIG. 14(b) illustrates an image showing a simulation result of light leakage of a curved liquid crystal display according to an exemplary embodiment.

As illustrated in FIGS. 14(a) and 14(b), in the curved liquid crystal display according to the exemplary embodiment, it may be seen that light leakage was significantly improved, as compared with the curved liquid crystal display according to the Comparative Example.

By way of summation and review, in the liquid crystal display, the pixel electrode and the common electrode (generating the electric field in the liquid crystal layer) may be provided on one display panel with a switching element. In the case where an in-plane switching mode liquid crystal display (in which the liquid crystal is driven by only an electric field of the lower electrode) is manufactured in a curved shape, light leakage due to distortion of the liquid crystal molecules may occur.

The embodiments may provide a curved liquid crystal display in which liquid crystal molecules are vertically aligned in an in-plane switching mode.

The embodiments may provide a curved liquid crystal display that helps prevent light leakage in an in-plane switching mode by vertically aligning initial liquid crystal molecules while driving a liquid crystal by an electric field of only a lower electrode.

The embodiments may provide a curved liquid crystal display having excellent display quality even if misalignment of an upper panel and a lower panel of the curved liquid crystal display were to occur.

As described above, the curved liquid crystal display according to the exemplary embodiment may have advantages of preventing light leakage of the curved liquid crystal display by vertically aligning initial liquid crystal molecules in an in-plane switching mode (in which a liquid crystal is driven by only an electric field of a lower electrode) and having excellent display quality, even in the case where misalignment of an upper panel and a lower panel of the curved liquid crystal display occurs.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

<Description of symbols>

| | |
|---|---|
| 3: Liquid crystal layer | 110, 210: Substrate |
| 100, 200: Display panel | 250: Overcoat |
| 121: Gate line | 124: Gate electrode |
| 131: Common electrode | 140: Gate insulating layer |
| 151, 154: Semiconductor | 161, 165: Ohmic contact |
| 171: Data line | 175: Drain electrode |
| 180x, 180y, 180z: Passivation layer | 183: Contact hole |
| 191: Pixel electrode | 220: Light blocking member |
| 230: Color filter | |

What is claimed is:

1. A curved liquid crystal display, comprising:
   a first substrate having a curved shape;
   a plurality of gate lines and a plurality of data lines on the first substrate;
   a plurality of thin film transistors connected to the plurality of gate lines and the plurality of data lines;
   a plurality of color filters on the plurality of thin film transistors;
   a plurality of pixel electrodes and common electrodes on the plurality of color filters, the plurality of pixel electrodes and common electrodes being insulated from each other by a first insulating layer;
   a second substrate having a curved shape, the second substrate facing the first substrate;
   vertical alignment layers on inner sides of the first substrate and the second substrate;
   a liquid crystal layer between the vertical alignment layers;
   a shielding electrode on the first substrate, the shielding electrode being at a position overlying an interface between two adjacent color filters of the plurality of color filters; and
   a column spacer overlapping the shielding electrode,
   wherein liquid crystal molecules of the liquid crystal layer are aligned to be vertical to surfaces of the first substrate and the second substrate when an electric field is not formed in the liquid crystal layer.

2. The curved liquid crystal display as claimed in claim 1, wherein the liquid crystal molecules are aligned to be horizontal to the surfaces of the first substrate and the second substrate and in the direction of the electric field, when the electric field is formed in the liquid crystal layer.

3. The curved liquid crystal display as claimed in claim 2, further comprising a light blocking member on the second substrate and at a position overlying a region where two adjacent color filters of the plurality of color filters overlap with each other.

4. The curved liquid crystal display as claimed in claim 3, wherein a width of the light blocking member is the same as or larger than a width of the data line.

5. The curved liquid crystal display as claimed in claim 3, wherein a portion of the color filters where the plurality of color filters overlaps with each other has a flat shape.

6. The curved liquid crystal display as claimed in claim 2, further comprising:
an additional electrode on the second substrate.

7. The curved liquid crystal display as claimed in claim 6, wherein the column spacer is attached onto the shielding electrode.

8. The curved liquid crystal display as claimed in claim 2, further comprising a light blocking member on the second substrate and at a position overlying a region where two adjacent color filters among the plurality of color filters overlap with each other.

9. The curved liquid crystal display as claimed in claim 8, wherein a width of the light blocking member is the same as or larger than a width of the data line.

10. The curved liquid crystal display as claimed in claim 8, wherein the column spacer is attached onto the light blocking member.

11. The curved liquid crystal display as claimed in claim 10, wherein a portion of the color filters where the plurality of color filters overlaps with each other has a flat shape.

12. The curved liquid crystal display as claimed in claim 2, further comprising a light blocking member between two adjacent color filters among the plurality of color filters, the light blocking member being on the first substrate and at a position overlying the data line.

13. The curved liquid crystal display as claimed in claim 12, wherein the column spacer is attached onto the light blocking member.

* * * * *